Oct. 21, 1952  B. BATTY  2,614,568
SMOKER'S PIPE
Filed May 29, 1950
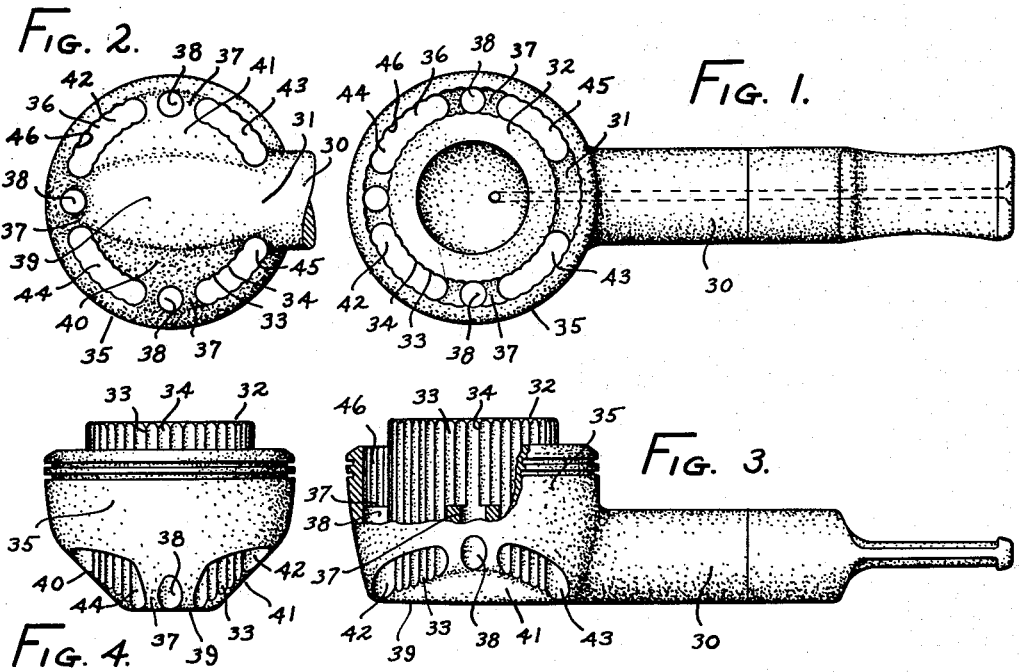
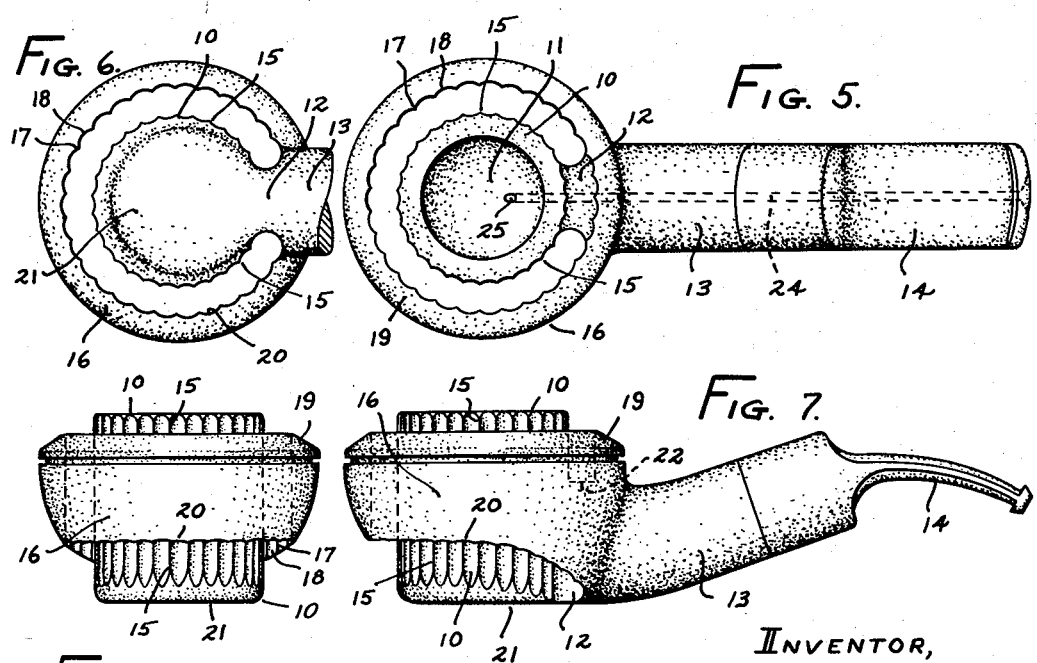
INVENTOR,
BERNARD BATTY,
By Herbert A. Minturn,
ATTORNEY.

Patented Oct. 21, 1952

2,614,568

UNITED STATES PATENT OFFICE 2,614,568

SMOKER'S PIPE

Bernard Batty, Indianapolis, Ind.

Application May 29, 1950, Serial No. 164,888

1 Claim. (Cl. 131—196)

This invention relates to a smoking pipe structure wherein the novelty lies in the new structure for maintaining a cool bowl. The structure consists primarily of the usual pipe bowl on the end of a stem, and a concentric wall air spaced from the bowl in order to provide vertically disposed air passage upwardly along the bowl, and at the same time to hold the bowl spaced from the smoker's hand or fingers.

The structure embodying the invention may be made out of the usually desirable briar birls so that the exterior of the pipe may be given the exquisite finish which has come to mark the better made pipes.

A primary advantage of the invention resides in the fact that the smoke drawn in from the bowl into the smoker's mouth arrives there in a relatively cool state and without the usual bite. No filters or other intervening devices are necessary between the bowl and the mouthpiece of the stem. The structure, independently of the stem, may be made out of one piece of material, and the invention permits of a wide range of esthetic exterior designs.

These and many other objects and advantages of the invention will become apparent to those versed in the art in the following description of the invention which is made in reference to the accompanying drawing, in which:

Fig. 1 is a top plan view of a pipe structure embodying the invention;

Fig. 2 is a bottom plan view;

Fig. 3 is a side elevation in partial section;

Fig. 4 is a view in end elevation;

Fig. 5 is a view in top plan on a slightly modified form of the invention;

Fig. 6 is a view in bottom plan view;

Fig. 7 is a view in side elevation; and

Fig. 8 is a view in end elevation.

Referring first to that form of the invention as illustrated in Figs. 5-8, a pipe bowl 10 is formed to be generally cylindrical in shape and having an integral floor 11. From one side of the bowl 10 there extends a portion 12 merging into a stem 13, to which in the present showing is secured a mouthpiece 14. The bowl 10 is provided with a smooth interior surface, and the exterior surface is fluted by providing a plurality of ribs 15 regularly spaced therearound, the surface between adjacent ribs being concave.

A shell 16 is formed integrally to extend from the stem 13 concentrically around the bowl 10. The spacing between the inner wall of this shell 16 and the outside wall of the bowl 10 is made to be substantially the same as the thickness of the wall of the bowl 10, but herein shown as slightly exceeding that thickness. The interior wall of the shell 16 is provided with a series of spaced ribs 17 therearound with concave areas 18 therebetween to form a continuous fluted surface.

As indicated in Figs. 7 and 8, this shell 16 terminates by a top beveled portion 19, the top side of which is spaced below the top of the bowl 10. The shell 16 is curved downwardly and inwardly to taper out to a thin lower edge 20, which edge 20 is in general spaced a distance above the bottom 21 of the bowl 10. However the edge 20 adjacent the stem 13 curves downwardly and around into that stem 13 to substantially its underside, as is best shown in Fig. 7.

The portion 12 intervening between the bowl 10 and the stem 13 which extends between the outside of the bowl 10 and the inside of the shell 16 terminates by its upper side 22 at a distance below the top of the bevel portion 19, as indicated by the dash line in Fig. 7. This termination top side is approximately in line with the upper side of the stem 13 at the juncture between it and the shell 16. The draft bore 24 extends from the mouthpiece down through the stem 13, through the portion 12 and terminates within the bowl at the orifice 25. The underside of the portion 12 is in the same plane as is the outside bottom 21 of the bowl 10.

Due to the limited vertical extent of the shell 16, both the top and bottom end portions of the bowl 10 are exposed above and below that shell 16. Obviously the upper part of the bowl 10 may be knocked against something solid without striking the shell 16 in order to remove the dottle. Also by reason of the fact that the shell 16 terminates by the edge 20 well above the bottom 21, the pipe can be rested upon the bowl base 21 if desired.

In holding the pipe, it may be gripped by the shell portion 16 without having the fingers come into direct contact with the bowl 10. Not only are the fingers of the pipe smoker's hand kept from being in contact with the lower part of the bowl 10, but the bowl 10 is removed from contact with those fingers so that heat may be dissipated to the atmosphere, and in fact carried upwardly by the air flowing along the vertically disposed ribs 15 between them and the shell 16 which in effect provides a column of an annular nature for an up draft of air.

Referring to that form of the invention as illustrated in Figs. 1-4, a stem 30 has a portion 31 which merges into a pipe bowl 32, at a lower bottom portion thereof. The bowl 32 is generally cylindrical in shape both inside and outside, and is provided with closely spaced flutes 33 defined by sharp line edges or ribs 34 therebetween.

A shell 35 surrounds the bowl 32 concentrically, and in spaced relation therefrom to leave a generally annular space 36 therebetween. A plurality of ties or bridges 37, herein shown as three in number, are provided to interconnect the lower portion of the bowl 32 with a lower portion of the shell 35. The upper sides of these bridges 37 terminate at substantially the midpoint of the height of the bowl 32.

In the form herein shown, each of these bridges 37 is bored vertically through to provide the vertical cylindrical passage 38 in each instance between the bowl 32 and the shell 35. In this form of the invention, the underside of the bowl 32 is provided with a central flat area 39, from each side of which there is an upwardly and outwardly sloping face 40 and 41 respectively. This sloping of the faces 40 and 41 is carried on into the shell 35 which in turn merges into that slope. This construction leaves four generally elliptical openings 42, 43 on the one side and 44, 45 on the other side, as viewed in side elevation. There is thus provided continuous openings throughout the vertical height of the bowl 32, not only through these major openings 42, 43, and 44, 45, but also through the cylindrical openings 38 provided in the bridges 37.

This construction leaves a relatively low height of the bridges 37 so that the major portion of the exterior of the bowl 32 is exposed to updrafts of air along that bowl and inside of the shell 35. Also the smoker's fingers are spaced from the bowl 32 proper by the shell 35, and the bridges 37 prevent accidental breaking of the shell 35 to a large extent. The inside wall of the shell 35 is provided with a plurality of closely spaced flutes 46. While the stem 30 in the form of the structure shown in Figs. 1-4 is shown to be straight, it can be curved upwardly as is the stem 13 in Figs. 5-8, and also the reverse. The exact conformation of the stem in any event, and also of the mouthpiece, does not form a part of the invention per se. It is further to be noted that the top end of the shell 35 terminates at a distance below the top of the bowl 32 in order to permit an exposure of that end of the bowl 32.

While I have herein shown and described my invention in two specific forms, it is obvious that structural variations may be employed without departing from the spirit of the invention, and I therefore do not desire to be limited to those precise forms beyond the limitations which may be imposed by the following claim.

I claim:

A one-piece wood smoking pipe comprising a generally cylindrical bowl having an external flat area across its under side; an integral stem attaching portion extending from one side at the lower end of the bowl, the under side of the stem portion merging into the bowl so that the stem portion under side lies in the plane of said area; said bowl being externally, vertically fluted to define projecting sharp ribs and concave surfaces therebetween; and a wood shell surrounding said bowl in spaced relation thereto, said shell terminating by a lower, substantially knife-edged portion from which the shell increases in thickness upwardly to its top upper portion to give a cross-sectional wedge shape; said shell being internally, substantially cylindrical and vertically fluted around its internal surface to define sharp ribs radially spaced from said bowl ribs and bounding concave surfaces therebetween, the shell ribs being in planes radial of the axis of said bowl to include said ribs of the bowl; said shell top edge portion being in a plane below the top edge of said bowl, and said shell having a circumferential lower edge extending around the front and to the sides of the bowl and lying in a plane substantially parallel to said top edge portion plane, the remainder of said shell lower edge sloping from said length on the respective pipe bowl sides, around and downwardly into said stem portion to terminate therein at said bowl area plane; said shell circumferential edge being spaced well above said bowl under side area; and said shell merging into and being supported by said stem attaching portion; said shell and said bowl defining therebetween a circumferential chamber essentially around a central band portion of said bowl, a lower portion of said chamber extending to said stem portion so as to expose the lower portion of the inner bowl section in the front and on the sides only.

BERNARD BATTY.

REFERENCES CITED

The following references are of record in the file of this patent:

UNITED STATES PATENTS

| Number | Name | Date |
|---|---|---|
| 611,575 | Gill | Sept. 27, 1898 |
| 858,737 | Marshall | July 2, 1907 |
| 1,552,456 | Smith | Sept. 8, 1925 |
| 1,585,746 | Watters | May 25, 1926 |
| 1,767,997 | Nicholls | June 24, 1930 |
| 1,871,365 | Griswold | Aug. 9, 1932 |
| 1,935,052 | Hayden | Nov. 14, 1933 |
| 2,329,578 | Andis | Sept. 14, 1943 |
| 2,373,592 | Arrington | Apr. 10, 1945 |
| 2,429,808 | Downing | Oct. 28, 1947 |
| 2,481,971 | Beeneck | Sept. 13, 1949 |